THIN-FILM STORAGE DIODE WITH TELLURIUM COUNTERELECTRODE

Filed April 18, 1967 3 Sheets-Sheet 1

Inventor:
John R. Richardson,
by Marvin Snyder
His Attorney.

Inventor:
John R. Richardson,
by Marvin Snyder
His Attorney.

THIN-FILM STORAGE DIODE WITH TELLURIUM COUNTERELECTRODE

Filed April 18, 1967 3 Sheets-Sheet 3

Inventor:
John R. Richardson,
by Marvin Snyder
His Attorney.

United States Patent Office 3,480,843
Patented Nov. 25, 1969

3,480,843

THIN-FILM STORAGE DIODE WITH TELLURIUM COUNTERELECTRODE

John R. Richardson, Schenectady, N.Y., assignor to General Electric Company, a corporation of New York Filed Apr. 18, 1967, Ser. No. 631,775
Int. Cl. H01l 3/00, 5/00
U.S. Cl. 317—234 12 Claims

ABSTRACT OF THE DISCLOSURE

A thin-film diode of stoichiometric gallium arsenide vacuum-deposited on a substrate of polycrystalline molybdenum, with an evaporated counter-electrode of tellurium, exhibits a bistable resistance at zero bias, as well as a negative resistance, when the counterelectrode is contacted either directly by a metal wire or by metal evaporated thereon. Because the stable resistance state of the diode is determined by polarity of applied current when the diode is in its negative resistance state, the diode also exhibits asymmetric characteristics, resulting in a storage capability. Deposition of tellurium directly onto the molybdenum also results in a bistable switching diode with storage capability. To ensure storage, a predetermined current is passed through the newly-fabricated diode, with the counterelectrode at a negative potential with respect to the substrate.

BACKGROUND OF THE INVENTION

This invention relates to diodes, and more particularly to thin-film diodes with tellurium counterelectrodes which exhibit storage and bistable switching effects. The invention herein described was made in the course of or under a contract or subcontract thereunder with the Air Force Department.

In the thin-film approach to the problem of microminiaturization, there exists a need for active thin-film devices which can be fabricated in place, on a substrate. Two general types of devices have been proposed to fill this need: field effect devices and tunneling devices. This invention describes a third type of device, referred to herein as a thin-film switching diode.

Thin-film switching diodes made by depositing gallium arsenide on substrates of polycrystalline molybdenum or tungsten have been known to exhibit a current-controlled negative resistance when used in conjuction with a tellurium counterelectrode. Heretofore, however, diodes of this general type have not been known to exhibit a bistable resistance at zero bias, in addition to a negative resistance. The present invention, therefore, concerns thin-film diodes of this general type exhibiting bistable resistance at zero bias. Moreover, when the diode of the instant invention is switched from a high resistance state to a low resistance state by reverse current, which flows when the counterelectrode is negative with respect to the substrate, the diode remains in this state even if the reverse current is reduced to zero; yet, if the diode is switched from the high to the low resistance state by forward current, which flows when the counterelectrode is positive with respect to the substrate, the diode reverts to its high resistance state as the forward current is reduced below a "holding" value. Thus, the diode exhibits an asymmetric current-voltage characteristic, even if the gallium arsenide film is omitted. Furthermore, when the diode of the instant invention conducts forward current of amplitude exceeding the "holding" value, it reverts to the high resistance state as the forward current is reduced below the "holding" value; hence the diode, either with or without the gallium arsenide film, also exhibits a storage effect in the form of a bistable resistance at zero bias, with the actual resistance state of the diode being determined by the direction of current causing the switching to occur.

SUMMARY OF THE INVENTION

Accordingly, one object of this invention is to provide a thin-film switching diode exhibiting a bistable switching characteristic at zero bias, and a method of making the switching diode.

Another object of this invention is to provide a thin-film storage diode which exhibits a polarity asymmetry in switching from a low resistance state to a high resistance state, and a method of making the storage diode.

Another object is to provide a microminiaturized bistable switching array and a method of making such array.

In accordance with a preferred embodiment of the invention, a method of making a thin-film storage diode is provided. This method comprises the steps of depositing a thin-film layer of gallium arsenide onto a substrate of one of the group of refractory metals consisting of molybdenum, tungsten and tantalum, depositing a layer of tellurium onto the layer of gallium arsenide, and applying a negative potential to the tellurium with respect of the substrate of sufficient amplitude to produce a current in excess of a predetermined forming value flowing through the tellurium.

In accordance with another preferred embodiment of the invention, a method of making a diode is provided comprising the steps of depositing a layer of tellurium onto a substrate of one of the group of refractory metals consisting of molybdenum, tungsten and tantalum, and applying a negative potential to the tellurium with respect to the substrate of sufficient amplitude to produce a current in excess of a predetermined forming value flowing through the tellurium.

In accordance with still another preferred embodiment of the invention, there is provided a storage diode having a substrate layer comprising one of the group of metals consisting of molybdenum, tungsten and tantalum, with a counterelectrode of tellurium, having one surface in intimate contact with one surface of the substrate. Contact is made to the counterelectrode either with a lead having a radius of curvature of the end in contact with the counterelectrode large with respect to the thickness of the tellurium, or with an evaporated metal contact. The device may be modified by separating the counterelectrode from the substrate with a thin film of gallium arsenide and contacting the tellurium directly with a wire of tungsten, indium or gold, or an evaporated layer of aluminum or gold.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF THE PREFERRED EMBODIMENTS

Figure 1:
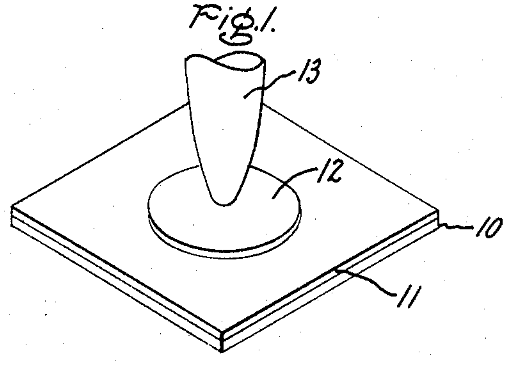
FIGURE 1 is an isometric view of one embodiment of the thin-film diode of the instant invention.

In FIGURE 1, the diode is shown having a substrate 10 which may comprise one of the group of metals consisting of molybdenum, tungsten and tantalum. Deposited on substrate 10 is a thin-film 11 of gallium arsenide having its lower surface in intimate contact with the upper surface of substrate 10. A tellurium counterelectrode 12 in the form of a dot is shown having its lower surface in intimate contact with a portion of the upper surface of gallium arsenide film 11. The diode is completed by making contact to counterelectrode 12 through a lead or rod 13 which may comprise a wire of tungsten, platinum, indium or gold, or an indium plated steel needle. Behavior of the diode is essentially independent of the type of metal which contacts the tellurium however, since the diode characteristics are substantially identical for different metals, whether used as wire contacts, or as evaporated metal contacts as described infra.

Figures 2, 3:
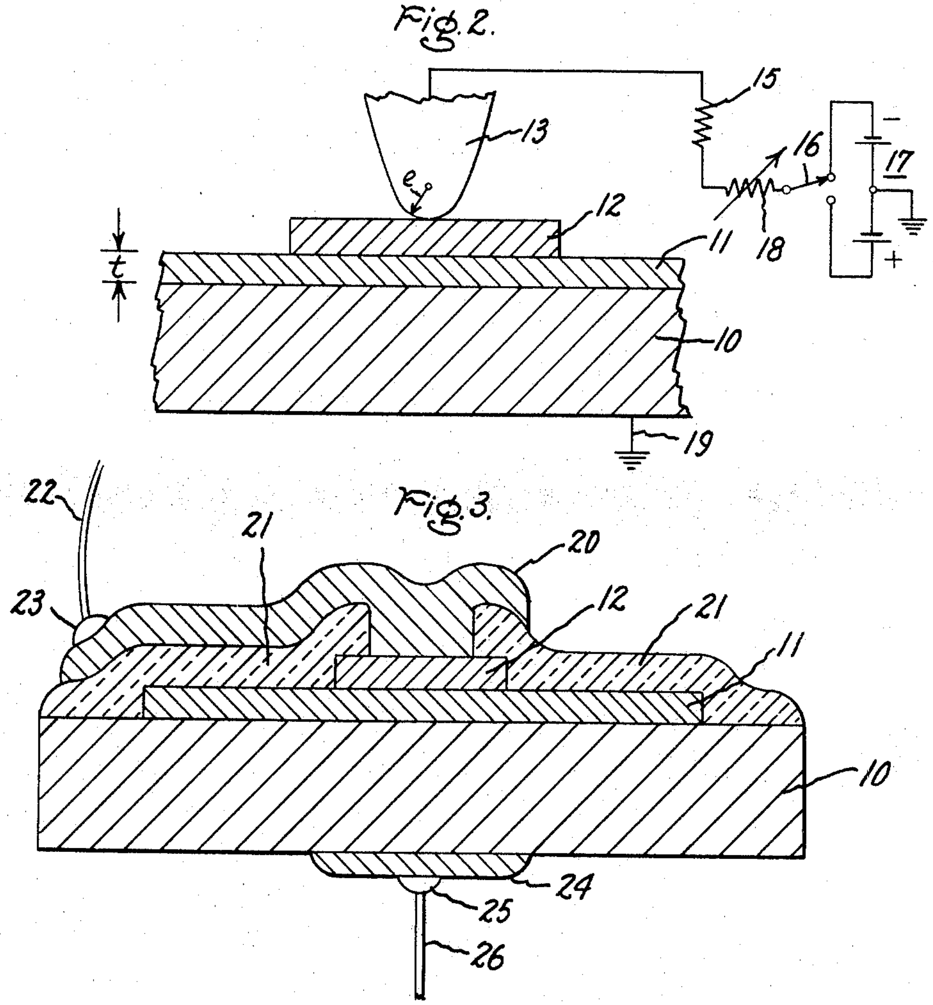
FIGURE 2 is a sectional view of the thin-film diode of FIGURE 1, showing circuitry for biasing the diode.
FIGURE 3 is a sectional view of a second embodiment of the thin-film diode of the instant invention.

In order to avoid punching wire or needle 13 through tellurium counterelectrode 12, the radius of curvature $\rho$ of the end of lead 13 which contacts tellurium counterelectrode 12, as shown in FIGURE 2, is large with respect to the thickness of either of counterelectrode 12 and thin-film 11; that is, $\rho$ is preferably at least equal to the thickness $t$ of thin-film 11. FIGURE 2 also indicates a lead or rod 19, which is attache dto substrate 10, as by soldering.

Means are indicated schematically, in FIGURE 2, to illustrate operation of the diode in controlling current through a load resistance 15. Thus, a switch 16 is indicated for supplying either positive or negative current from a current supply means 17 having a grounded centertap, through a variable resistance 18. Lead 19 is grounded. Thus, switch 16 functions as a reversing switch for supplying either forward or reverse current through the diode, while resistance 18 permits amplitude variation of this current.

A second embodiment of the diode of the instant invention is shown in FIGURE 3. This embodiment is similar to that of FIGURES 1 and 2 in that thin-film 11 of gallium arsenide is sandwiched between substrate 10 and counterelectrode 12. However, contact to counterelectrode 12 is made by an evaporated strip 20 of metal, such as aluminum or gold. This metal strip is deposited over the diode after first coating the diode with a layer of insulation 21, such as silicon oxide, and then etching away the region of insulation above counterelectrode 12. Contact to strip 20 may be made by a lead 22 through solder 23, while contact to substrate 10 may be made by similarly evaporating a metallic electrode 24 thereon, such as aluminum, and attaching a lead 26 thereto by means of solder 25, or by spot welding lead 26 directly to the substrate.

Figure 4:
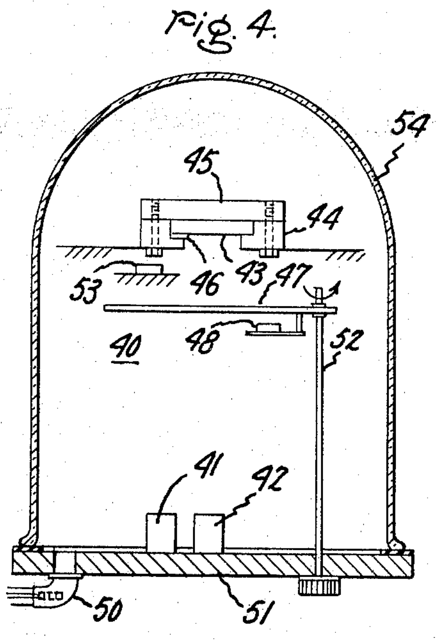
FIGURE 4 is a schematic diagram of apparatus used in fabricating the gallium arsenide film for the diodes of FIGURES 1 and 2.

The gallium arsenide film for the switching device of the instant invention may be fabricated with apparatus as indicated schematically in FIGURE 4 by evaporation of gallium arsenide on carefully cleaned substrates of polycrystalline refractory metals, such as molybdenum, tungsten or tantalum. This in followed by evaporation of a tellurium counterelectrode onto the device. Deposition of the gallium arsenide film is accomplished in an evaporator 40 pumped down to a pressure of $1\times10^{-7}$ millimeters of mercury, by simultaneous evaporation of gallium from a heated graphite crucible 41, and arsenic from a tantalum oven 42, onto the substrate 43.

Figure 5:
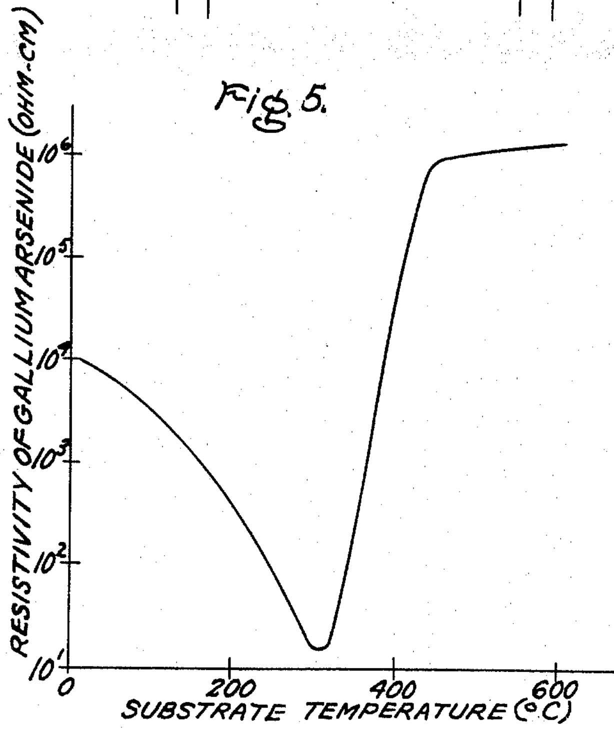
FIGURE 5 is a curve to aid in explaining the process of fabricating thin-film diodes in accordance with the instant invention.

The substrate, whether it be in the form of a thin sheet of a refractory metal or a thin-film of the refractory metal evaporated onto a clean insulating substrate, is cleaned prior to mounting in the evaporator by heating the substrate at 1000° C. at a pressure of about $1\times10^{-6}$ millimeters of mercury for one hour. After the substrate is mounted on a holder 44, preferably comprised of the same material as the substrate, in the evaporator, it is heated at 600° C. by a heater 45 at a pressure of $1\times10^{-7}$ millimeters of mercury for one hour. The substrate is then slowly cooled to the desired temperature for evaporation of gallium arsenide thereon. Resistivity of the evaporated gallium arsenide is dependent upon substrate temperature during evaporation. This is illustrated by the graph of FIGURE 5, which is a plot of resistivity in ohm-centimeters versus substrate temperature in ° C. Substrate temperature may be measured by a thermocouple spot-welded to a thin piece of tantalum 46 which is clamped between the substrate holder and the substrate. With a shutter 47 within the evaporator closed, so as to shield the substrate from impinging molecules, the current supplied to a resistance heater (not shown) surrounding graphite crucible 41 containing the gallium is increased until the gallium deposition rate becomes steady at a predetermined value, which is approximately half the desired deposition rate of gallium arsenide. The gallium deposition rate is monitored preferably by measuring frequency of a quartz crystal oscillator 48 mounted on the shutter so as to be bombarded by gallium molecules. Deposition of the gallium molecules on the crystal portion of the oscillator results in addition of a mass thereto, changing the resonant frequency of the crystal; that is, frequency of oscillation is proportional to the mass of molecules deposited on the crystal. By differentiating the difference in frequency between that of the crystal oscillator and that of a reference frequency, the rate at which gallium is being deposited may be determined. A convenient oscillator for use in measuring gallium deposition rate utilizes a 9.350 megacycle AT cut quartz crystal.

While the substrate is still shielded by the shutter, tantalum oven 42 is heated by furnishing current thereto. Temperature of the oven is monitored preferably by a thermocouple (not shown) spot-welded to the inner case of the oven.

The molecules emitted by a heated arsenic source are primarily of the $As_4$ species. Because these molecules have a small sticking coefficient (that is, only a small fraction of such molecules which strike the wall surfaces of an evaporator remain fixed on the surface), most of the $As_4$ molecules rebound from wall to wall in the evaporator and do not condense until a film begins to nucleate at a cold spot or within an ionization gauge. This behavior is due to the fact that the $As_4$ molecule is very stable, but also can be readily ionized by electrons of 100 volts energy. Thus, the flux of a molecular beam of arsenic may be measured by placing an ionization gauge in the arsenic molecule beam so as to bombard the arsenic molecules with electrons which are emitted by the heated filament of the gauge and accelerated by a grid thereof at a positive potential with respect to the filament. The molecules which are so ionized are collected by a cathode of the gauge. Hence, the cathode current is proportional to the density of molecules in the beam and the probability that an energetic electron will ionize the molecule. The ionization gauge, however, is preferably removed from the gallium and arsenic sources and the substrate, so as to avoid bombarding the sources and substrate with impurities emanating from the ionization gauge filament. Hence, the flux of arsenic molecules on shutter 47 is determined by the pressure measured by an ionization gauge 50 mounted on the base plate 51 of the evaporator. This pressure is identical to that which would be read by a gauge placed directly in the beam of arsenic molecules due to the very low sticking coefficient of the arsenic molecules on the bell jar 54 and other parts of the evaporator.

As the evaporation rate of arsenic is gradually increased by a gradual increase in current through tantalum oven 42, the differential of the difference in frequency between that of crystals oscillator 48 and that of the reference frequency is monitored, along with pressure within the evaporator. The temperature of oven 42 and corresponding evaporator pressure for which the rate of deposition of arsenic on the crystal of crystal oscillator 48 saturates are thus found and, to assure an excess of arsenic, evaporator pressure is increased by at least a factor of 2 by further increasing the temperature of arsenic source 42. It should be noted that arsenic is deposited on the quartz crystal only when gallium is simultaneously evaporated along with the arsenic.

Saturation, in the sense used in the previous paragraph, referes to the fact that the deposition rate of arsenic continues to increase until equal amounts of gallium and arsenic are being deposited and there is no gallium free to combine with the excess arsenic molecules. The excess arsenic, having a low sticking coefficient, essentially fails to stick to the surfaces on which it impinges, even at room temperature, so that saturation may be reached. When both the deposition rates of gallium and arsenic are at equilibrium, as indicated by the quartz crystal oscillator frequency and evaporator pressure, the shutter 47 shielding the substrate from the gallium and arsenic molecules may be opened by rotating a rod 52 communicating therewith. A detailed discussion of sticking coefficients may be found in Deposition of Atomic Beams by S. Wexler, 30 Reviews of Modern Physics 402–409, April 1958.

After equilibrium has been achieved and shutter 47 has been opened, the deposition rate of gallium arsenide is monitored by switching to another crystal oscillator 53 operating at an identical frequency but situated behind shutter 47 so as to monitor deposition of gallium arsenide on substrate 43. The shutter is maintained open until a predetermined frequency change of the crystal oscillator frequency is detected, indicating that the thickness of the deposit on the quartz crystal of oscillator 53 has been achieved. The deposition rate is maintained constant by adjusting current to gallium source 41 so as to keep the reading of the rate of deposition, as determined by the differential of the difference between the reference frequency and frequency of oscillator 53 having a quartz crystal situated behind the shutter, constant. However, distance between the crystal and the source of evaporated molecules must be taken into consideration since the further the crystal is from the source, the lower the rate of molecular deposition thereon. The arsenic flux is controlled by varying current to arsenic source 42 so as to maintain a constant ion current through ionization gauge 50. In practice, it has been found that a frequency change of 50 kilocycles on a 9.350 megacycle quartz crystal corresponds to a 250 microgram per square centimeter deposit. For gallium arsenide, this produces a film of 4,300 angstrom units in thickness.

After the desired thickness of gallium arsenide film has been deposited, shutter 47 within the evaporator is closed to prevent further accumulation of gallium arsenide on substrate 43, and heating of the gallium, arsenic and the substrate is discontinued. After the substrate has cooled to below 200° C., the tellurium counterelectrode is evaporated through a hole in a mask onto the gallium arsenide film to a thickness approximately equal to that of the gallium arsenide film and with a diameter typically of about 5 mils. The tellurium is evaporated from a graphite crucible (not shown) heated by a tantalum oven, as used for the gallium source. A typical tellurium deposition rate is 0.5 microgram per square centimeter per second, as measured by the quartz crystal rate monitor.

After coating the diode with a layer of insulation in the form of silicon oxide and etching away the region of silicon oxide above the counterelectrode, metal contacts may then be evaporated onto the tellurium counterelectrode and the substrate. When leads are attached to the metal contacts, the diode configuration appears as illustrated in FIGURE 3, with the silicon oxide serving to insulate the counterelectrode contact from the gallium arsenide.

When the diode is completed and contact has been made to the tellurium conuterelectrode by either a tungsten, gold or indium wire, or by an evaporated film of aluminum or gold, the initial current-voltage characteristic depends on the gallium arsenide resistivity and the conditions under which the counterelectrode was deposited. Ohmic behavior is observed when the gallium arsenide resistivity is below $10^4$ ohm-cm. For higher resistivties, the current varies as the square of applied potential, provided the counterelectrode is deposited onto the gallium arsenside prior to exposing the surface of the gallium arsenside to the atmosphere.

The completed diode is initially in its OFF or high resistance state. This high resistance is generally between $10^3$ and $10^6$ ohms, depending on the resistivity of the gallium arsenide. When the counterelectrode is driven positive in excess of a threshold voltage $V_{TH}$ with respect to the substrate, voltage across the diode falls to a value between 0.7 and 1.0 volt, representing the low resistance on ON state, and remains substantially constant at this value as current is increased. Resistance of the diode, when in the ON state, ranges from 100–500 ohms. The magnitude of $V_{TH}$ varies linearly with thickness of the gallium arsenide film, and is typically 3 volts for a film thickness of 1000 angstroms. When current is decreased below a holding value $I_H$, the diode switches back to its OFF state.

If the counterelectrode is driven negative with respect to the substrate, the diode switches from its OFF state to its ON state when the magnitude of voltage $V_{TH}$ is exceeded. However, during the initial switching, with the counterelectrode negative with respect to the substrate, current is allowed to exceed a forming value, which ranges between 5 and 10 ma., thus ensuring that the diode will not switch to the OFF state as this current is reduced toward zero but will remain in its low resistance or ON state. Thus, after this forming step, the switching characteristics of the diode are as illustrated in FIGURES 6A–6E.

Figure 6A:
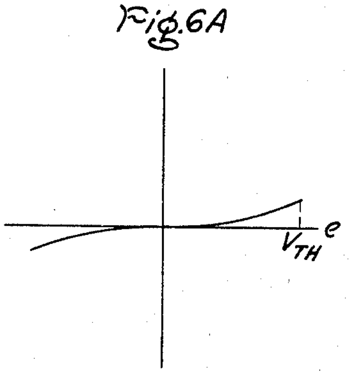
FIGURES 6A–6E are graphical representations of the switching characteristics of thin-film diodes fabricated in accordance with the teachings of the instant invention.
Figure 6B:
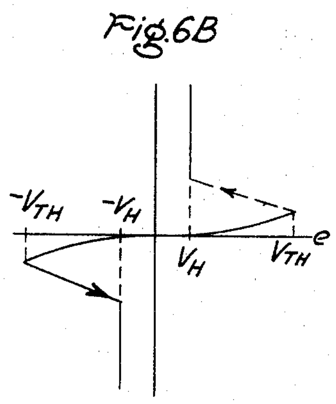
Figure 6C:
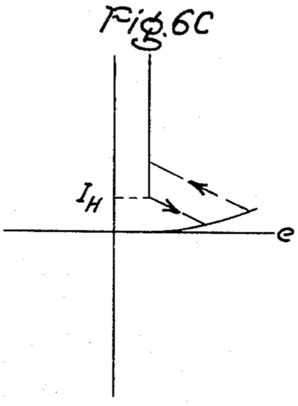

The switching characteristics of the thin-film gallium arsenide diodes of the instant invention, as illustrated in FIGURES 6A–6E, employ the convention that applied voltage is positive when the counterelectrode is positive with respect to the substrate, and that forward or positive current flows through the diode from the counter-electrode toward the substrate. A diode initially in the OFF or high resistance state is depicted in FIGURE 6A. This diode remains in the OFF state for all applied voltages below a threshold $V_{TH}$, which may be 3.0 volts as previously described. If this threshold voltage is exceeded, for either polarity, the diode switches to the ON or low resistance state, as shown in FIGURE 6B. Although not indicated in FIGURE 6B for clarity of illustration, the diode, when in the forward-biased ON condition emits noise in the frequency range of 10 MHz. Typically, the holding voltage $V_H$ across the diode, when in the ON state, is approximately 0.7 volt, and the amplitude of the noise, at its maximum, is approximately 20 percent of the holding voltage. Because of this phenomenon, it is possible to detect the forward-biased ON condition of the diode with a radio receiver without any circuit coupling between the two. As the forward-biased ON current is increased above a holding value $I_H$ as shown in FIGURE 6C however, the amplitude of this noise signal decreases from its maximum value.

Figure 6D:
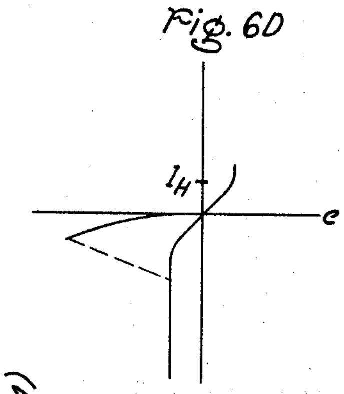
Figure 6E:
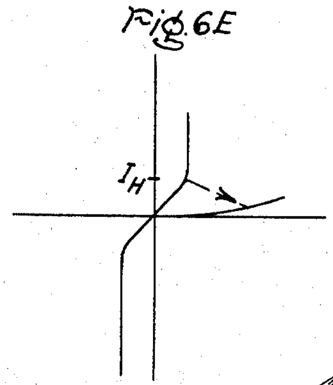

For switching with current of positive polarity, the diode remains in the ON state until the current is reduced below the holding value $L_H$. Thus, for currents below $I_H$, switching back to the OFF state takes place as shown in FIGURE 6C, along the downward directed dotted line. FIGURE 6D, however, shows a different behavior for current in a negative direction. Here, the diode remains in the ON state for all values of negative current and for positive currents below $I_H$. To return the diode to the OFF condition, current $I_H$ must be exceeded in the positive direction, and the diode is then switched by decreasing the forward or positive current, as shown in FIGURE 6E. Typical switching times are fractions of microseconds, but these times are circuitry limited and hence may be reduced by proper physical configuration of the circuitry. Moreover, since both states of the diode are stable with no applied potential, the diode is adaptable to use as a memory device.

Figure 7:
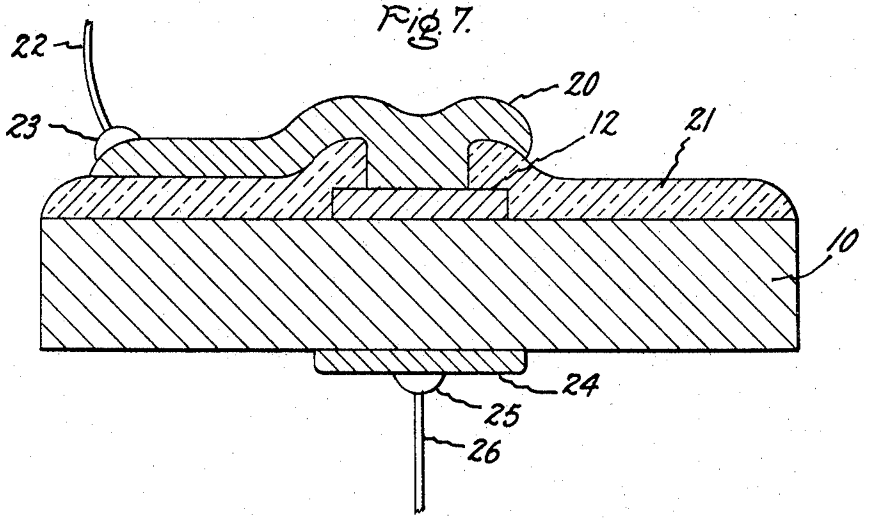
FIGURE 7 is a sectional view of an other embodiment of the diode of the instant invention.

The threshold voltage $V_{TH}$ increases linearly with thickness of the gallium arsenide film. If the gallium arsenide film is omitted from the diode however, and the tellurium deposited directly onto the substrate, the tellurium film itself exhibits a bistable resistance at zero bias and a negative resistance. These diodes display the same current-controlled negative resistance as those which include the gallium arsenside film, except that the threshold voltage exceeds the sustained voltage in the ON state by only a few tenths of a volt. This constant voltage portion of the ON state is maintained, as when a thin-film of gallium arsenide is present, at 0.7 to 1.0 volt. The forming effect during the first switching cycle to ensure existence of the storage effect is performed in a manner identical to that described for diodes which include the gallium arsenide film. Resistance of the OFF state for diodes without the gallium arsenide film is typically from $10^3$ to $10^4$ ohms, and in the ON state is typically about 100 ohms, although this may vary with structural parameters. FIGURE 7 illustrates a diode corresponding to that shown in FIGURE 3, but with the gallium arsenide film omitted, wherein like numerals indicate like components.

Since both negative resistance and bistable resistance at zero bias have been observed for diodes comprised of thin-films of tellurium between two metal electrodes and for diodes comprised of a double layer structure of tellurium and gallium arsenide between the two electrodes, it is apparent that the storage properties and asymmetries must be related to the thin-film of tellurium and the asymmetric contacts thereto. Also, since the constant voltage region of the low resistance state occurs at 0.7 to 1.0 volt whether gallium arsenide is present or not, for films of gallium arsenide less than 2000 angstroms thick this represents the voltage necessary to produce a large number of charge carriers in the tellurium by a process such as avalanche breakdown. The 0.7 to 1.0 volt sustaining voltage is much larger than the 0.2 volt required for avalanche breakdown of single crystal tellurium. This is because the evaporated layers of tellurium are amorphous and have an energy gap between 0.7 and 1.0 volt, as compared to the 0.2 volt energy gap of single crystal tellurium. The evaporated tellurium is amorphous since it is deposited onto a substrate maintained at temperatures below 200° C. The small difference between the threshold voltage and the sustaining voltage for diodes which do not utilize a gallium arsenide layer may be due to space charge effects.

In diodes comprised of a layer of tellurium in contact with a layer of gallium arsenide, threshold voltage amplitudes exceed those for diodes which omit the gallium arsenide, provided the gallium arsenide layer is of high resistance. This causes resistance of the diode in the nonconductive state to increase, so that most of the applied voltage initially appears across the gallium arsenide. At threshold, sufficient voltage exists across the gallium arsenide to change its resistance from a high to a low value. One possible mechanism for this phenomenon may be due to existence of deep levels in the forbidden gap of the gallium arsenide, which are being filled, making the gallium arsenide film semi-insulating. As long as these levels are being filled by electrical carriers, resistance of the gallium arsenide film remains high. Once sufficient electrical carriers have been injected into the gallium arsenide to fill these levels however, the injected carriers are no longer trapped, but are free to carry current through the film. The resulting drop in resistance causes the current through the diode to increase, and voltage across the diode decreases due to the series resistance of the circuit. With the gallium arsenide in the low resistance state, the 0.7 to 1.0 volt necessary to sustain avalanche in the tellurium appears across the tellurium, and very little voltage appears across the very low resistance gallium arsenide layer.

Figure 8:
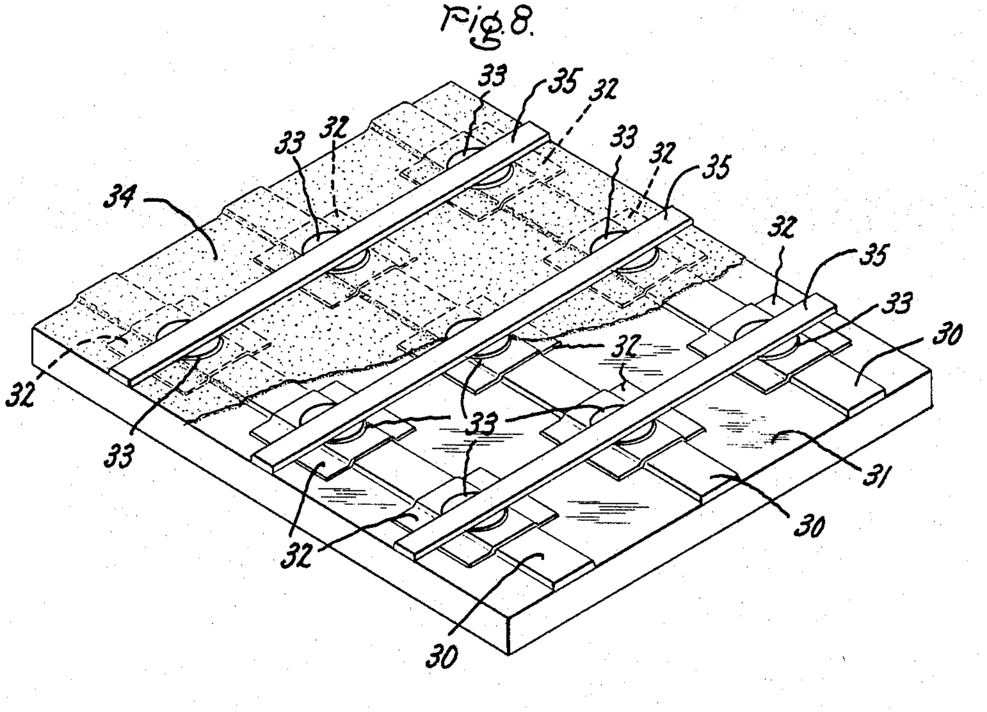
FIGURE 8 is a partially broken-away isometric view of a switching array formed by a matrix of thin-film diodes in accordance with the teachings of the instant invention.

In the event an interconnected array of switching diodes is to be fabricated, as illustrated in FIGURE 8, a plurality of strips 30 of refractory metals, such as molybdenum, are deposited on an insulating substrate 31 such as silicon dioxide, quartz, etc. by evaporating or sputtering through a mask. Thereafter, regions of gallium arsenide 32 are evaporated through a mask onto desired locations along strips 30. Next, a plurality of tellurium counterelectrodes 33 are evaporated through holes in a mask. A layer of insulation 34, such as silicon oxide, is next evaporated onto the film and etched in the regions above the counterelectrodes. Metallic contact strips 35, such as gold or aluminum, are then deposited through a mask according to a predetermined interconnection pattern, resulting in the array illustrated in FIGURE 8. To accomplish X–Y selection of any diode in a matrix, metal strips 30 are generally deposited in a parallel configuration so as to form rows which are electrically insulated from each other. Similarly, the columns of metallic strips 35 are directed perpendicularly to strips 30 over the tellurium counterelectrodes, thereby enabling X–Y selection of any individual diodes by energization of any predetermined row and any predetermined column. The entire array may thereafter be coated with an insulation layer of silicon oxide.

The foregoing describes a thin-film switching diode exhibiting a bistable characteristic. Moreover, because the device of the instant invention exhibits a polarity asymmetry in switching from a low resistance to a high resistance state, the device may be utilized as a microminiaturized storage diode. A method of making the diode is also described. Further, an array of such diodes, as well as a method of making such array is also described.

I claim:

1. An asymmetric thin film memory diode comprising:
a substrate layer,
said substrate layer comprising one of the group of metals consisting of molybdenum, tungsten and tantalum; and
a thin film counterelectrode consisting essentially of tellurium,
said counterelectrode having one surface in intimate contact with one surface of said substrate layer, said thin film memory diode exhibiting an asymmetric voltage-current characteristic.

2. The asymmetric thin-film memory diode of claim 1 including bias means coupled to said tellurium counterelectrode and said substrate.

3. The asymmetric thin-film memory diode of claim 1 including conductive means connected to said counterelectrode, and being comprised of one of the group consisting of tungsten, indium and gold.

4. The asymmetric thin-film memory diode of claim 3 wherein said conductive means is in the form of a rod having one end in contact with said counterelectrode and including bias means coupled to said conductive means and said substrate.

5. The asymmetric thin-film memory diode of claim 1 including a thin-film of gallium arsenide sandwiched between said substrate layer and said tellurium counterelectrode, said diode further including conductive means in the form of a rod having an end in contact with said counterelectrode and being comprised of one of the group consisting of tungsten, indium and gold, the radius of curvature of the end of said rod in contact with said counterelectrode being larger than the thickness of said counterelectrode.

6. The asymmetric thin-film memory diode of claim 1 including a thin-film of gallium arsenide sandwiched between said substrate layer and said tellurium counterelectrode, said diode further including conductive means in the form of an evaporated metallic layer in contact with said counterelectrode, said metallic layer comprising one of the group consisting of aluminum and gold

7. The asymmetric thin-film memory diode of claim 9 including bias means coupled to said conductive means and said substrate.

8. A matrix of thin film memory diodes, at least one of said diodes exhibiting an asymmetric voltage-current characteristic, said matrix comprising:

an insulating substrate;

a first plurality of strips deposited substantially in parallel with each other on said substrate, said strips of said first plurality comprising one of the group consisting of molybdenum, tungsten and tantalum;

a plurality of thin-film counterelectrodes consisting essentially of tellurium deposited at uniformly spaced locations on each strip of said first plurality; and a second plurality of metallic strips deposited substantially orthogonally to said first plurality of strips so that each strip of said second plurality contacts one of said counterelectrodes on each strip of said first plurality crossed by said strip of said second plurality.

9. The matrix of thin-film diodes of claim 8 including a thin-film of gallium arsenide sandwiched between each of said tellurium counterelectrodes and the strip of said first plurality over which said each counterelectrode is deposited.

10. A method of making an asymmetric thin-film memory diode comprising the steps of depositing a layer consisting essentially of tellurium onto a substrate comprising one of the group of refractory metals consisting of molybdenum, tungsten and tantalum; and applying a negative potential to the tellurium with respect to the substrate of sufficient amplitude to produce a current through the tellurium which ranges between 5 and 10 milliamperes to ensure that said diode exhibits a low resistance characteristic as said current is reduced toward zero.

11. A method of making an asymmetric thin-film diode comprising the steps of: depositing a thin-film layer of gallium arsenide onto a substrate comprising one of the group of refractory metals consisting of molybdenum, tungsten and tantalum, said substrate being maintained at a predetermined temperature below 600° C.; allowing said substrate to cool; depositing a layer consisting essentially of tellurium onto said gallium arsenide after said substrate has cooled to below 200° C.; and applying a negative potential to the tellurium with respect to the substrate of sufficient amplitude to produce a current through the tellurium which ranges between 5 and 10 milliamperes to ensure that said diode exhibits a low resistance characteristic as said current is reduced toward zero.

12. The method of making an asymmetric thin-film memory diode of claim 11 wherein said process is performed with ambient pressure continuously maintained at a level of substantially $1 \times 10^{-7}$ millimeters of mercury.

References Cited

UNITED STATES PATENTS

| | | | |
|---|---|---|---|
| 3,271,591 | 9/1966 | Ovshinsky | 307—88.5 |
| 3,290,569 | 12/1966 | Weimer | 317—235 |
| 3,384,879 | 5/1968 | Stahl et al. | 340—173 |
| 3,341,362 | 9/1967 | Hacskaylo | 117—217 |

FOREIGN PATENTS

| | | |
|---|---|---|
| 1,431,313 | 1/1966 | France. |

JOHN W. HUCKERT, Primary Examiner

MARTIN H. EDLOW, Assistant Examiner

U.S. Cl. X.R.

117—230; 148—33; 307—324; 340—173